(12) United States Patent
Suit

(10) Patent No.: US 9,495,152 B2
(45) Date of Patent: Nov. 15, 2016

(54) AUTOMATIC BASELINING OF BUSINESS APPLICATION SERVICE GROUPS COMPRISED OF VIRTUAL MACHINES

(75) Inventor: John M. Suit, Mount Airy, MD (US)

(73) Assignee: Red Hat, Inc., Raleigh, NC (US)

(*) Notice: Subject to any disclaimer, the term of this patent is extended or adjusted under 35 U.S.C. 154(b) by 833 days.

(21) Appl. No.: 12/979,245

(22) Filed: Dec. 27, 2010

(65) Prior Publication Data

US 2012/0166625 A1    Jun. 28, 2012

(51) Int. Cl.

| | | |
|---|---|---|
| G06F 15/16 | (2006.01) | |
| G06F 9/06 | (2006.01) | |
| G06F 9/46 | (2006.01) | |
| G06Q 10/00 | (2012.01) | |
| G06F 9/455 | (2006.01) | |
| G06F 9/50 | (2006.01) | |

(52) U.S. Cl.
CPC ............ G06F 9/06 (2013.01); G06F 9/45558 (2013.01); G06F 9/46 (2013.01); G06F 9/5027 (2013.01); G06Q 10/00 (2013.01); G06F 2009/4557 (2013.01); G06F 2209/501 (2013.01)

(58) Field of Classification Search
CPC .................................... G06F 9/06; G06F 9/46
USPC ......................................................... 709/224
See application file for complete search history.

(56) References Cited

U.S. PATENT DOCUMENTS

| | | |
|---|---|---|
| 5,440,719 A | 8/1995 | Hanes et al. |
| 6,513,059 B1 | 1/2003 | Gupta et al. |
| 6,658,465 B1 | 12/2003 | Touboul |
| 6,836,800 B1 | 12/2004 | Sweet et al. |
| 6,871,223 B2 | 3/2005 | Drees |
| 6,901,442 B1 | 5/2005 | Schwaller et al. |
| 7,082,463 B1 | 7/2006 | Bradley et al. |
| 7,181,769 B1 | 2/2007 | Keanini et al. |
| 7,356,679 B1 | 4/2008 | Le et al. |
| 7,409,719 B2 | 8/2008 | Armstrong et al. |
| 7,546,598 B2 | 6/2009 | Blumenthal et al. |
| 7,571,349 B2 | 8/2009 | Levidow et al. |
| 7,600,259 B2 | 10/2009 | Qi |
| 7,624,172 B1 | 11/2009 | Austin-Lane |

(Continued)

FOREIGN PATENT DOCUMENTS

| | | |
|---|---|---|
| WO | WO2005050414 A1 | 6/2005 |
| WO | WO2005101782 A1 | 10/2005 |

OTHER PUBLICATIONS

Red Hat Office Action for U.S. Appl. No. 12/979,222, mailed Dec. 27, 2012.

(Continued)

Primary Examiner — Douglas Blair
(74) Attorney, Agent, or Firm — Lowenstein Sandler LLP

(57) ABSTRACT

An example method of automatically establishing a baseline of virtual machines operating in a network may include parsing service group ontology information stored of an established service group to determine components of a business application service group that are communicating with one another. The example method may also include tracking the current state of the business application service group to determine if any changes have occurred since a previous service business application service group configuration, and, if so, updating the ontology information to reflect those changes, and generating a list of candidate virtual machines that are candidates for participating in the established baseline.

20 Claims, 9 Drawing Sheets

(56) References Cited

U.S. PATENT DOCUMENTS

| | | |
|---|---|---|
| 7,698,545 B1 | 4/2010 | Campbell et al. |
| 7,761,917 B1 | 7/2010 | Kumar |
| 7,769,720 B2 | 8/2010 | Armington |
| 7,774,498 B1 | 8/2010 | Kraemer et al. |
| 7,793,162 B2 | 9/2010 | Mock et al. |
| 7,826,602 B1 | 11/2010 | Hunyady et al. |
| 7,877,781 B2 | 1/2011 | Lim |
| 7,886,294 B2 | 2/2011 | Dostert et al. |
| 7,890,318 B2 | 2/2011 | Castellani et al. |
| 7,949,404 B2 | 5/2011 | Hill |
| 7,953,696 B2 | 5/2011 | Davis et al. |
| 7,962,738 B2 | 6/2011 | Zimmer et al. |
| 7,975,058 B2 | 7/2011 | Okmianski et al. |
| 7,987,359 B2 | 7/2011 | Kawano et al. |
| 7,996,836 B1 | 8/2011 | McCorkendale et al. |
| 8,098,658 B1 | 1/2012 | Ranganathan et al. |
| 8,102,781 B2 | 1/2012 | Smith |
| 8,127,290 B2 | 2/2012 | Suit |
| 8,145,760 B2 * | 3/2012 | Dinda et al. .................. 709/226 |
| 8,156,378 B1 | 4/2012 | Suit |
| 8,161,475 B2 | 4/2012 | Araujo, Jr. et al. |
| 8,185,442 B2 | 5/2012 | Kiran Vedula |
| 8,191,141 B2 | 5/2012 | Suit et al. |
| 8,234,377 B2 | 7/2012 | Cohn |
| 8,250,182 B2 | 8/2012 | Frank et al. |
| 8,295,277 B2 | 10/2012 | Vadlakonda et al. |
| 8,336,108 B2 | 12/2012 | Suit et al. |
| 8,356,353 B2 | 1/2013 | Futoransky et al. |
| 8,396,946 B1 | 3/2013 | Brandwine et al. |
| 8,429,748 B2 | 4/2013 | Suit et al. |
| 8,478,878 B2 | 7/2013 | Freimuth et al. |
| 8,539,570 B2 | 9/2013 | Sharma et al. |
| 8,656,009 B2 | 2/2014 | Suit |
| 8,656,219 B2 | 2/2014 | Suit |
| 8,850,423 B2 | 9/2014 | Barkie et al. |
| 8,850,442 B2 * | 9/2014 | Davis et al. .................. 718/104 |
| 8,903,983 B2 * | 12/2014 | Bakman et al. .............. 709/224 |
| 9,043,785 B1 * | 5/2015 | Suit .................. 718/1 |
| 9,104,458 B1 * | 8/2015 | Brandwine et al. |
| 2003/0014626 A1 | 1/2003 | Poeluev et al. |
| 2003/0046586 A1 | 3/2003 | Bheemarasetti et al. |
| 2003/0084329 A1 | 5/2003 | Tarquini |
| 2003/0101245 A1 | 5/2003 | Srinivasan et al. |
| 2003/0120935 A1 | 6/2003 | Teal et al. |
| 2003/0145225 A1 | 7/2003 | Bruton, III et al. |
| 2003/0158983 A1 | 8/2003 | Dalakuras et al. |
| 2003/0177112 A1 | 9/2003 | Gardner |
| 2003/0225876 A1 | 12/2003 | Oliver et al. |
| 2004/0122937 A1 | 6/2004 | Huang et al. |
| 2004/0133672 A1 | 7/2004 | Bhattacharya et al. |
| 2005/0010765 A1 | 1/2005 | Swander et al. |
| 2005/0044206 A1 | 2/2005 | Johansson et al. |
| 2005/0102529 A1 | 5/2005 | Buddhikot et al. |
| 2005/0125503 A1 | 6/2005 | Iyengar et al. |
| 2005/0125520 A1 | 6/2005 | Hanson et al. |
| 2005/0240558 A1 | 10/2005 | Gil et al. |
| 2005/0240606 A1 | 10/2005 | Edelstein et al. |
| 2005/0268298 A1 | 12/2005 | Hunt et al. |
| 2005/0289648 A1 | 12/2005 | Grobman et al. |
| 2006/0037072 A1 | 2/2006 | Rao et al. |
| 2006/0041885 A1 | 2/2006 | Broquere et al. |
| 2006/0069768 A1 | 3/2006 | Wen et al. |
| 2006/0074833 A1 | 4/2006 | Gardner et al. |
| 2006/0123133 A1 | 6/2006 | Hrastar |
| 2006/0136720 A1 | 6/2006 | Armstrong et al. |
| 2006/0156380 A1 | 7/2006 | Gladstone et al. |
| 2006/0195715 A1 | 8/2006 | Herington |
| 2006/0230134 A1 | 10/2006 | Qian et al. |
| 2006/0271395 A1 | 11/2006 | Harris et al. |
| 2007/0011667 A1 | 1/2007 | Subbiah et al. |
| 2007/0043860 A1 | 2/2007 | Pabari |
| 2007/0058551 A1 | 3/2007 | Brusotti et al. |
| 2007/0061382 A1 | 3/2007 | Davis et al. |
| 2007/0083506 A1 | 4/2007 | Liddell et al. |
| 2007/0118394 A1 | 5/2007 | Cahoon |
| 2007/0130566 A1 | 6/2007 | van Rietschote et al. |
| 2007/0147271 A1 | 6/2007 | Nandy et al. |
| 2007/0169121 A1 | 7/2007 | Hunt et al. |
| 2007/0198656 A1 | 8/2007 | Mazzaferri et al. |
| 2007/0204153 A1 | 8/2007 | Tome et al. |
| 2007/0220121 A1 | 9/2007 | Suwarna |
| 2007/0234412 A1 | 10/2007 | Smith et al. |
| 2007/0238524 A1 | 10/2007 | Harris et al. |
| 2007/0261112 A1 | 11/2007 | Todd et al. |
| 2008/0005124 A1 | 1/2008 | Jung et al. |
| 2008/0016115 A1 | 1/2008 | Bahl et al. |
| 2008/0016570 A1 | 1/2008 | Capalik |
| 2008/0047009 A1 | 2/2008 | Overcash et al. |
| 2008/0056487 A1 | 3/2008 | Akyol et al. |
| 2008/0089338 A1 | 4/2008 | Campbell et al. |
| 2008/0126856 A1 | 5/2008 | Levidow et al. |
| 2008/0140795 A1 | 6/2008 | He et al. |
| 2008/0184225 A1 | 7/2008 | Fitzgerald et al. |
| 2008/0256010 A1 | 10/2008 | Moran et al. |
| 2008/0263658 A1 | 10/2008 | Michael et al. |
| 2008/0270049 A1 * | 10/2008 | Kim et al. ...................... 702/58 |
| 2008/0270104 A1 | 10/2008 | Stratton et al. |
| 2008/0271025 A1 | 10/2008 | Gross et al. |
| 2008/0288962 A1 | 11/2008 | Greifeneder et al. |
| 2008/0320123 A1 | 12/2008 | Houlihan et al. |
| 2008/0320499 A1 | 12/2008 | Suit |
| 2008/0320561 A1 | 12/2008 | Suit et al. |
| 2008/0320583 A1 | 12/2008 | Sharma et al. |
| 2008/0320592 A1 | 12/2008 | Suit et al. |
| 2009/0007270 A1 | 1/2009 | Futoransky et al. |
| 2009/0028053 A1 | 1/2009 | Kannan et al. |
| 2009/0049453 A1 | 2/2009 | Baran et al. |
| 2009/0089781 A1 | 4/2009 | Shingai et al. |
| 2009/0119301 A1 | 5/2009 | Cherkasova et al. |
| 2009/0172666 A1 | 7/2009 | Yahalom et al. |
| 2009/0182880 A1 | 7/2009 | Inamdar et al. |
| 2009/0182928 A1 | 7/2009 | Becker et al. |
| 2009/0183173 A1 | 7/2009 | Becker et al. |
| 2009/0204701 A1 | 8/2009 | Herzog et al. |
| 2009/0210427 A1 | 8/2009 | Eidler et al. |
| 2009/0216816 A1 | 8/2009 | Basler et al. |
| 2009/0228579 A1 | 9/2009 | Sanghvi et al. |
| 2009/0228589 A1 | 9/2009 | Korupolu |
| 2009/0254993 A1 | 10/2009 | Leone |
| 2009/0293022 A1 | 11/2009 | Fries |
| 2009/0307772 A1 | 12/2009 | Markham et al. |
| 2010/0011200 A1 | 1/2010 | Rosenan |
| 2010/0017801 A1 | 1/2010 | Kundapur |
| 2010/0049731 A1 | 2/2010 | Kiran Vedula |
| 2010/0077078 A1 | 3/2010 | Suit et al. |
| 2010/0110932 A1 | 5/2010 | Doran et al. |
| 2010/0138390 A1 | 6/2010 | Lobo et al. |
| 2010/0146503 A1 | 6/2010 | Tsai et al. |
| 2010/0161604 A1 | 6/2010 | Mintz et al. |
| 2010/0269109 A1 | 10/2010 | Cartales |
| 2010/0281482 A1 | 11/2010 | Pike et al. |
| 2010/0287263 A1 | 11/2010 | Liu et al. |
| 2010/0293544 A1 | 11/2010 | Wilson et al. |
| 2010/0318609 A1 | 12/2010 | Lahiri et al. |
| 2010/0332432 A1 | 12/2010 | Hirsch |
| 2011/0113467 A1 | 5/2011 | Agarwal et al. |
| 2011/0126198 A1 | 5/2011 | Vilke et al. |
| 2011/0209140 A1 | 8/2011 | Scheidel et al. |
| 2011/0225277 A1 | 9/2011 | Freimuth et al. |
| 2011/0231839 A1 | 9/2011 | Bennett et al. |
| 2011/0289204 A1 | 11/2011 | Hansson et al. |
| 2012/0054346 A1 | 3/2012 | Lee et al. |
| 2012/0072968 A1 | 3/2012 | Wysopal et al. |
| 2012/0096065 A1 | 4/2012 | Suit et al. |
| 2012/0096134 A1 | 4/2012 | Suit |
| 2012/0096142 A1 | 4/2012 | Suit |
| 2012/0096143 A1 | 4/2012 | Suit |
| 2012/0096171 A1 | 4/2012 | Suit |
| 2012/0136989 A1 | 5/2012 | Ferris et al. |
| 2012/0167214 A1 | 6/2012 | Suit et al. |
| 2012/0185913 A1 | 7/2012 | Martinez et al. |
| 2012/0221898 A1 | 8/2012 | Suit |
| 2013/0055341 A1 | 2/2013 | Cooper et al. |
| 2013/0060839 A1 | 3/2013 | Van Biljon et al. |

(56) References Cited

U.S. PATENT DOCUMENTS

| | | | |
|---|---|---|---|
| 2013/0091496 | A1 | 4/2013 | Barsness et al. |
| 2013/0143522 | A1 | 6/2013 | Rege et al. |
| 2013/0275975 | A1* | 10/2013 | Masuda et al. ............ 718/1 |
| 2014/0109083 | A1 | 4/2014 | Scheidel et al. |
| 2015/0143366 | A1* | 5/2015 | Suragi Math et al. ........ 718/1 |

OTHER PUBLICATIONS

Red Hat Office Action for U.S. Appl. No. 12/979,222, mailed Jul. 2, 2013.
Red Hat Office Action for U.S. Appl. No. 12/979,222, mailed Nov. 20, 2015.
Red Hat Office Action for U.S. Appl. No. 12/979,229, mailed Apr. 4, 2013.
Red Hat Office Action for U.S. Appl. No. 12/979,229, mailed Aug. 12, 2013.
Red Hat Office Action for U.S. Appl. No. 12/979,229, mailed Nov. 19, 2015.
Red Hat Office Action for U.S. Appl. No. 12/979,237, mailed Jul. 1, 2013.
Red Hat Office Action for U.S. Appl. No. 12/979,237, mailed Dec. 3, 2013.
Red Hat Office Action for U.S. Appl. No. 12/979,237, mailed Apr. 23, 2014.
Red Hat Notice of Allowance for U.S. Appl. No. 12/979,237, mailed Dec. 4, 2014.
Red Hat Notice of Allowance for U.S. Appl. No. 12/979,237, mailed Jun. 25, 2015.
Red Hat Notice of Allowance for U.S. Appl. No. 12/979,237, mailed Jan. 14, 2016.
Red Hat Office Action for U.S. Appl. No. 12/979,259, mailed Jun. 5, 2013.
Red Hat Office Action for U.S. Appl. No. 12/979,259, mailed Nov. 6, 2013.
Red Hat Office Action for U.S. Appl. No. 12/979,259, mailed Jul. 3, 2014.
Red Hat Office Action for U.S. Appl. No. 12/979,259, mailed Nov. 13, 2014.
Red Hat Office Action for U.S. Appl. No. 12/979,259, mailed Mar. 12, 2015.
Red Hat Office Action for U.S. Appl. No. 12/979,259, mailed Jul. 23, 2015.
Red Hat Office Action for U.S. Appl. No. 12/979,259, mailed Jan. 19, 2016.
Red Hat Office Action for U.S. Appl. No. 12/979,255, mailed Dec. 27, 2012.
Red Hat Office Action for U.S. Appl. No. 12/979,255, mailed May 3, 2013.
Red Hat Office Action for U.S. Appl. No. 12/979,255, mailed Jul. 7, 2015.
Red Hat Office Action for U.S. Appl. No. 12/979,255, mailed Nov. 23, 2015.
Red Hat Office Action for U.S. Appl. No. 11/767,173, mailed Jul. 6, 2010.
Red Hat Office Action for U.S. Appl. No. 11/767,173, mailed Dec. 14, 2010.
Red Hat Notice of Allowance for U.S. Appl. No. 11/767,173, mailed Nov. 7, 2011.
Red Hat Office Action for U.S. Appl. No. 13/408,980, mailed Feb. 25, 2013.
Red Hat Notice of Allowance for U.S. Appl. No. 13/408,980, mailed Jun. 12, 2013.
Red Hat Office Action for U.S. Appl. No. 11/867,456, mailed Aug. 1, 2011.
Red Hat Office Action for U.S. Appl. No. 11/867,456, mailed Feb. 16, 2011.
Red Hat Office Action for U.S. Appl. No. 11/867,456, mailed Jan. 19, 2012.
Red Hat Notice of Allowance for U.S. Appl. No. 11/867,456, mailed Jul. 16, 2012.
Red Hat Office Action for U.S. Appl. No. 12/111,110, mailed Mar. 17, 2011.
Red Hat Office Action for U.S. Appl. No. 12/111,110, mailed Aug. 17, 2011.
Red Hat Office Action for U.S. Appl. No. 12/111,110, mailed Jan. 18, 2012.
Red Hat Office Action for U.S. Appl. No. 12/111,110, mailed Jun. 11, 2012.
Red Hat Notice of Allowance for U.S. Appl. No. 12/111,110, mailed Jan. 31, 2013.
Red Hat Office Action for U.S. Appl. No. 12/626,872, mailed Jan. 13, 2012.
Red Hat Office Action for U.S. Appl. No. 12/626,872, mailed May 30, 2012.
Red Hat Notice of Allowance for U.S. Appl. No. 12/626,872, mailed Dec. 20, 2012.
Red Hat Office Action for U.S. Appl. No. 12/013,304, mailed Apr. 13, 2011.
Red Hat Office Action for U.S. Appl. No. 12/013,304, mailed Oct. 4, 2011.
Red Hat Office Action for U.S. Appl. No. 12/013,304, mailed Jul. 25, 2013.
Red Hat Notice of Allowance for U.S. Appl. No. 12/013,304, mailed Sep. 18, 2014.
Red Hat Office Action for U.S. Appl. No. 12/013,314, mailed Jul. 19, 2011.
Red Hat Office Action for U.S. Appl. No. 12/013,314, mailed Mar. 7, 2012.
Red Hat Office Action for U.S. Appl. No. 12/013,314, mailed Sep. 9, 2013.
Red Hat Notice of Allowance for U.S. Appl. No. 12/013,314, mailed Jul. 28, 2014.
Hardwood, Aaron, Parallel Virtual Machine, Oct. 22, 2003, pp. 1-5.
Janiquec, Virtual Server 2005 R2 Common Issues and Tips—Duplicate MAC Addresses, Nov. 29, 2007, pp. 1-2 online link: http://msvirt.wordpress.com/2007/11/29/virtual-server-2005-r5-common-issues-and-tips-duplicate-mac-addresses/.
"Gao et al. A Fast and Generic Hybrid Simulation Approach Using C Virtual Machine ACM 978-1-50503-826-8/07/0009CASES '07, Sep. 30, 2007."
Magnusson et al. Simics: A Full System Simulation Platform 0018-91 62/02, IEEE 2002.
Red Hat Office Action for U.S. Appl. No. 12/905,565, mailed Oct. 12, 2012.
Red Hat Office Action for U.S. Appl. No. 12/905,565, mailed Apr. 11, 2013.
Red Hat Office Action for U.S. Appl. No. 12/905,565, mailed Sep. 27, 2013.
Red Hat Notice of Allowance for U.S. Appl. No. 12/905,565, mailed Apr. 18, 2014.
Red Hat Office Action for U.S. Appl. No. 12/905,645, mailed Sep. 13, 2012.
Red Hat Office Action for U.S. Appl. No. 12/905,645, mailed Mar. 26, 2013.
Red Hat Office Action for U.S. Appl. No. 12/905,645, mailed May 6, 2015.
Red Hat Office Action for U.S. Appl. No. 12/905,645, mailed Nov. 18, 2015.
Red Hat Office Action for U.S. Appl. No. 12/905,688, mailed Oct. 4, 2012.
Red Hat Office Action for U.S. Appl. No. 12/905,688, mailed Feb. 27, 2013.
Red Hat Office Action for U.S. Appl. No. 12/905,688, mailed Sep. 11, 2013.
Red Hat Office Action for U.S. Appl. No. 12/905,688, mailed Mar. 18, 2014.
Red Hat Notice of Allowance for U.S. Appl. No. 12/905,688, mailed Sep. 10, 2014.

(56) References Cited

OTHER PUBLICATIONS

Red Hat Office Action for U.S. Appl. No. 12/905,761, mailed Oct. 22, 2012.
Red Hat Office Action for U.S. Appl. No. 12/905,761, mailed Apr. 11, 2013.
Red Hat Notice of Allowance for U.S. Appl. No. 12/905,761, mailed Oct. 4, 2013.
Red Hat Office Action for U.S. Appl. No. 12/905,850, mailed Dec. 6, 2012.
Red Hat Office Action for U.S. Appl. No. 12/905,850, mailed Jul. 30, 2013.
Red Hat Office Action for U.S. Appl. No. 12/905,850, mailed Feb. 18, 2014.
Red Hat Office Action for U.S. Appl. No. 12/905,850, mailed Sep. 29, 2014.
Red Hat Office Action for U.S. Appl. No. 12/905,850, mailed Jun. 3, 2015.
Red Hat Office Action for U.S. Appl. No. 12/905,850, mailed Dec. 22, 2015.
Red Hat Office Action for U.S. Appl. No. 12/905,879, mailed Jul. 8, 2011.
Red Hat Notice of Allowance for U.S. Appl. No. 12/905,879, mailed Dec. 8, 2011.
Red Hat Office Action for U.S. Appl. No. 13/439,803, mailed Aug. 31, 2012.
Red Hat Notice of Allowance for U.S. Appl. No. 13/439,803, mailed Feb. 21, 2012.

* cited by examiner

| BASG Profile | Threshold Data Input | Service Tier Threshold Metric (Required for VM Candidate) |
|---|---|---|
| High Capacity | CPU & Memory | CPU: 15%-39%  Memory: 5%-34% |
| High Availability | Uptime | 99.5%-100% |
| High Speed | Network Device | 80%-100% |
| Moderate Capacity | CPU & Memory | CPU: 40%-60%  Memory: 35%-60% |
| Moderate Availability | Uptime | 99%-99.5% |
| Moderate Speed | Network Device | 65-79% |
| Low Capacity | CPU & Memory | CPU: 61%-90%  Memory: 61%-90% |
| Low Availability | Uptime | 98%-99% |
| Low Speed | Network Device | 30%-64% |

*Those "Virtual Machines" with less than or above the indicated metrics are considered "Not Viable" for candidate consideration pairing.

FIG. 3B

AUTOMATIC BASELINING OF BUSINESS APPLICATION SERVICE GROUPS COMPRISED OF VIRTUAL MACHINES

CROSS REFERENCE TO RELATED APPLICATIONS

This application is related to applications: U.S. patent application Ser. No. 11/767,173, filed on Jun. 22, 2007, titled "Method and system for cloaked observation and remediation of software attacks," now issued U.S. Pat. No. 8,191, 141;

U.S. patent application Ser. No. 11/867,456, filed on Oct. 4, 2007, titled "Method and system for collaboration involving enterprise nodes," now issued U.S. Pat. No. 8,336,108; and U.S. patent application Ser. No. 12/626,872, filed on Nov. 27, 2009, titled "Network traffic analysis using a dynamically updating ontological network description," now issued U.S. Pat. No. 8,429,748.

This application is further related to the Applicant's co-pending applications:

U.S. patent application Ser. No. 12/905,565, filed on Oct. 15, 2010 titled "Identification of business process application service groups," now issued U.S. Pat. No. 8,825,838.

U.S. patent application Ser. No. 12/905,645, filed on Oct. 15, 2010 titled "System and method for migration of network entities to a cloud infrastructure."

U.S. patent application Ser. No. 12/905,688, filed on Oct. 15, 2010 titled "Monitoring system performance changes based on configuration modification," now issued U.S. Pat. No. 8,938,489.

U.S. patent application Ser. No. 12/905,761, filed on Oct. 15, 2010 titled "Indicating an impact of a change in state of a node,", now issued U.S. Pat. No. 8,656,009.

U.S. patent application Ser. No. 12/905,850, filed on Oct. 15, 2010 titled "System and method for enterprise nodes that are contained within a public cloud to communicate with private enterprise infrastructure dependencies."

U.S. patent application Ser. No. 12/905,879, filed on Oct. 15, 2010 titled "System and method for determination of the root cause of an overall failure of a business application service," now issued U.S. Pat. No. 8,156,378.

U.S. patent application Ser. No. 12/979,229, filed on Dec. 27, 2010 titled "Automatic Determination of Required Resource Allocation of Virtual Machines."

U.S. patent application Ser. No. 12/979,237, filed on Dec. 27, 2010 titled "Assigning virtual machines to business application service groups based on ranking of the virtual machines," now issued U.S. Pat. No. 9,354,960

U.S. patent application Ser. No. 12/979,222, filed on Dec. 27, 2010 titled "Performing Dependency Analysis on Nodes of a Business Application Service Group."

U.S. patent application Ser. No. 12/979,259, filed on Dec. 27, 2010 titled "Automatic Simulation of Virtual Machine Performance."

U.S. patent application Ser. No. 12/979,255, filed on Dec. 27, 2010 titled "Performing Predictive Modeling of Virtual Machine Relationships."

The entire contents of each of the above mentioned applications are specifically incorporated herein by reference in their entireties.

TECHNICAL FIELD

Embodiments of the invention relate to analyzing network traffic analysis and, in particular, to performing automatic determining of business application service group baselines within a communications network.

BACKGROUND

Traditionally enterprises are comprised of various nodes that contribute to an overall business process. An enterprise may be thought of as a geographically dispersed network under the jurisdiction of one organization. It often includes several different types of networks and computer systems from different vendors.

These network nodes that are part of the enterprise may be comprised of both physical and virtual machines. Enterprise networks that include a plurality of virtual machines may require a physical host, which is required to allocate resources among the virtual machines.

Groups of network nodes included in the enterprise may form business process application service groups (BASGs). The "components" of these groups are comprised of virtual machines, hosts, storage devices and network devices. Each of these components may be dependent on one another. In an operational enterprise environment, enterprise nodes change dynamically. For instance, nodes are configured, re-configured, migrated, placed off-line, and may experience varying changes throughout the life of the node. Measuring the performance of the network and its corresponding nodes may provide the information necessary to maintain optimal operating conditions of the BASGs.

BRIEF DESCRIPTION OF THE DRAWINGS

Features of the invention are more fully disclosed in the following detailed description of the invention, reference being had to the accompanying drawings described in detail below.

FIG. 3B illustrates an example table of BASG profile information and related input data and corresponding threshold metric values for the virtual machine candidates, according to example embodiments of the present invention.

DETAILED DESCRIPTION

Figure 1:
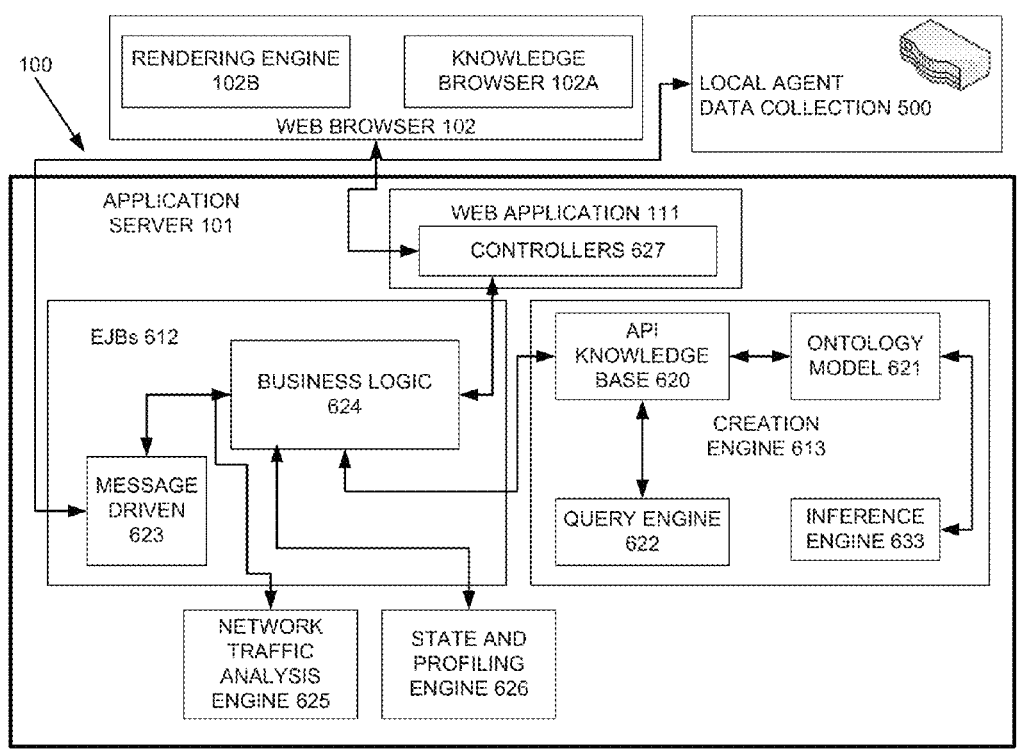
FIG. 1 illustrates an example embodiment of a system for creating and updating an ontological description of a network.

Example embodiments of the present invention may include a method of automatically establishing a baseline of virtual machines operating in a network. The method may include parsing service group ontology information stored in a memory of an established service group to determine components of a business application service group that are communicating with one another. The method may also include tracking the current state of the business application service group to determine if any changes have occurred since a previous business application service group configuration, and, if so, updating the ontology information to reflect those changes. The method may also include generating a list of candidate virtual machines that are candidates for participating in the established baseline.

Another example embodiment of the present invention may include an apparatus to automatically establish a baseline of virtual machines operating in a network. The apparatus may include a memory, and a processor. The processor may be configured to parse service group ontology information, stored in the memory, of an established service group to determine components of a business application service group that are communicating with one another. The processor may be further configured to track the current state of the business application service group to determine if any changes have occurred since a previous business application service group configuration, and, if so, the processor is further configured to update the ontology information to reflect those changes, and generate a list of candidate virtual machines that are candidates for participating in the established baseline.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Specific example embodiments of the present invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms.

FIG. 1 illustrates an example logic diagram of a system 100 configured to deploy data collection agents onto network nodes, according to example embodiments of the present invention. Referring to FIG. 1, an application server 101 interfaces with a web browser 102 and a local agent data collection network element 500. Certain operations may be performed, such as, monitoring network connections instantiated at each network node, acquiring resulting data, automatically creating an ontological description of the network from the acquired data, dynamically updating the ontological description, etc.

According to an example embodiment, elements of system 100 may utilize the Java® software platform and Enterprise Java Bean® (EJB) architecture to provide certain functionality. These well-known terms may be used in the description that follows. Other software platforms and architectures, providing similar functionality may be used without departing from the scope of the present invention.

System 100 may include an application server 101, which interacts across a network with a number of data collection agents 500. Application server 101, may be an element of an administrative console (AC) that also provides a suite of network management tools. A system administrator may perform network traffic analysis and/or other network management tasks by accessing application server 101 through a web browser 102. Application server 101 may consist of an EJB module 612, an ontological description creation engine 613, and a web application 111. Web browser 102 may include a rendering engine 102B and a knowledge browser 102A.

In operation, data collection agent(s) 500 may be deployed onto network nodes including physical and/or virtual machines in an enterprise information technology (IT) infrastructure environment. After such deployment, application server 101 receives messages from data collection agents 500. These messages may include data representing, for example, state and relationship information about the network nodes, configuration information related to the IT infrastructure, performance/utilization data and network communication. Thresholds are assigned to a component and/or can be assigned to an entire business application service groups (BASG). A host may provide CPU usage as a resource allocated to a virtual machine, the CPU operational usage performance is an example metric. The virtual machine and host machine are both examples of components.

The received messages may be initially handled by EJB module 612. For example, message driven EJB 623 may initially inspect a received message. A received message relating to network traffic or node status may be forwarded by message driven EJB 623 to the business logic EJB 624. Business logic EJB 624 may call network traffic analysis engine 625 for messages relating to network traffic. Alternatively, "infrastructure messages" (i.e., those messages relating to node status) may be forwarded directly to the state and profiling engine 626.

Messages forwarded to the state and profiling engine 626 may undergo sorting and processing. The state and profiling engine 626, for example, may identify the entities within the IT infrastructure as well as their dependency on one another, based on messages received from the platform. In addition, state and profiling engine 626 may perform further processing to determine the state of one or more entities. State may be based on a threshold that has been defined, for example, by the system administrator. The threshold may include a metric that either exceeds or underperforms in a specific area of interest to the system administrator. An example threshold may be set for a server operating in the enterprise network that is exceeding a specified CPU utilization percentage, a disk utilization percentage and/or a memory utilization percentage.

A data output from state and profiling engine 626 may be sent to ontological description creation engine 613. Initially, the data may be handled by a resource description framework (RDF) application programming interface (API) knowledge base 620, where the data is categorized and stored utilizing a predefined entity relationship determined by ontology web language (OWL) API or ontology model 621.

Messages handled by the network traffic analysis engine 625 may include source-to-destination data, qualified by a communicating application within the operating system of the originating node, as well as frequency of communication information. This received data is analyzed by processing the number and type of connections to determine if an ontological "communicates_with" relationship exists. A determination may be made by tracking the number of connections of a specific application over a period of time. The period of time may be preselected, for example, by the system administrator.

Data output from network traffic analysis engine 625 may be sent to ontological description creation engine 613. Initially, the data may be handled by the RDF API knowledge base 620 where the data is categorized and stored utilizing a predefined entity relationship, determined by OWL API ontology model 621. For example, OWL API ontology model 621 may define what entity classes exist, their possible relationship to each other, and their possible state.

Figure 2A:
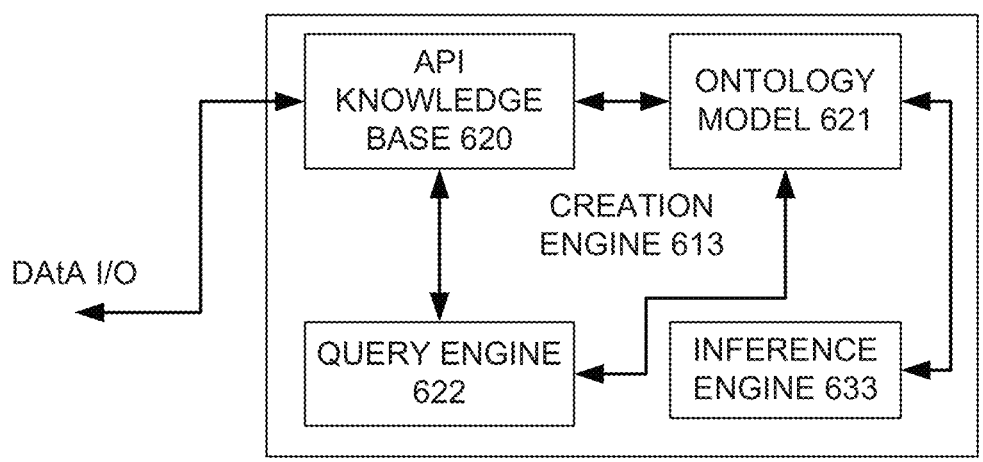
FIG. 2A illustrates an example baseline logic diagram, according to an example embodiment.

FIG. 2A illustrates a detailed diagram of ontological description creation engine 613, according to example embodiments of the present invention. Referring to FIG. 2A, as data is received by RDF API knowledge base 620, logic in the RDF API knowledge base 620 may map the incoming data to the appropriate ontological classes and relationships defined by OWL ontology API model 621. Once the correct classes and relationships are selected, the entity and relationship information may be entered into RDF API knowledge base 620. The knowledge base may also be forwarded to a SPARQL database or query engine 622 for later inference processing by inference engine 633. Inference engine 633 may determine inferred relationships based on the ontology model contained in OWL ontology API model 621.

The model and structure the system uses to create and update the knowledge base is contained within a web ontology language (OWL) file present on the application server 101. OWL is a family of knowledge representation languages for authoring ontologies which are a formal representation of the knowledge by a set of concepts within a domain and the relationships between those concepts. Ontologies are used to reason about the properties of that domain, and may be used to describe the domain. The ontology provides the direct and indirect dependency information the (SPARQL) query engine 622 requires to infer the impact a change in "state" will have on the rest of a service group or BASG.

In an enterprise network, a business application will typically include a primary application with one or more executables that execute on one or more nodes of the network. These nodes may have direct and indirect dependencies on other nodes of the network. The business application may be described by a network ontology. When an alert state occurs for the business application, the components of the business application ontology may be analyzed to determine what adjustments are required to achieve a steady state based on assigned thresholds. The root cause may be a direct or indirect root cause which may then be reported to the system administrator.

According to an example embodiment, a visualization of a current network state and/or communication activity may be provided to an administrator. The system administrator may be provided with a visual rendering (e.g., on a computer monitor) of the knowledge base. The visualization may be filtered to any selected entity of interest. For example, referring again to FIG. 1, the system administrator or other user may use a web browser 102 to request rendering of data via web application 111 from controllers 627.

Controllers 627 may pass along any filtering information such as a specific Host ID. Next, business logic EJB 624 may be called by the controllers. Business logic EJB 624 may query RDF API knowledge base 620 for requested data. The requested data may be returned through controllers 627 to the web browser. The requested data may then be converted into a directed graph by a rendering engine.

Example embodiments of the present invention may provide the ability to automatically determine allocation adjustments that may be required for virtual machine performance, and monitoring the service tier thresholds assigned to a specified virtual machine. Thresholds are directly related to a node "state". The state may be defined as an indicator to the system and the user of a business application service, such as, whether, the business application service meets a specified or threshold requirement. The process to determine the state of an individual element may be based on a threshold that has been defined, for example, by the system administrator. The threshold may include a metric that either exceeds or underperforms in a specific area of interest of the system administrator. An example would be a server in a network that is exceeding a specified CPU utilization percentage.

Example embodiments of the present invention may also provide the ability to baseline business process application service groups (BASGs) within an operational enterprise environment. A service group may be comprised of one to many nodes operating on a network. The automatic baselining may be performed based on the ontological structure of the categorized BASGs.

A file may be created and stored in memory. The file may be a resource definition framework (RDF) based knowledge base file included in the ontology web language (OWL) format. The format of the file may be constructed of "triples" and data values. A triple may include a particular format, for example, CLASS-Object-Property-CLASS. The specific classes are referred to as "individuals", for instance, Person-Drove-Car may be an example triple. Another example may be "John(Individual)-Drove(Object Property)-Car(Class)." In this example, "Car" is an example class and "Drove" is an object value. If, for example, a TRIPLE existed that included "CAR-Has_name-Ferrari(Individual)", then the inference engine 633 may infer that if only one car existed in the knowledge base 620, then John(Individual)-Drove (Object property)-Ferrari(Individual) and car would be the class. This is referred to as a "triple" because there are 3 objects.

Data values provide information about the objects contained within the triple. The system 100 will automatically look for other triples that contain the same objects to build an ontology for the overall knowledge base 602. For example, after reading "John-Drove-Car" the inference engine 633 will look for other triples that have John, Drove and Car. When an analysis is required of the originating component "John" the system 100 may discover that only one "car" component and one class and car exist.

The file may contain a structure that includes classes, object properties, and data values that may be utilized for any analysis. Classes may be represented as components such as, hosts, virtual machines, storage devices, network devices, users, primary applications, regular applications, owners, etc. Object properties may be thought of as verbs associated with the relationship. For example, host "uses" storage devices, and virtual machine "uses" network devices. Data values are the specific values associated with a class or object property, and are usually associated with the state or volume of relationships. For example, a virtual machine identified as "w2k3004" uses "4" storage devices, and may have a state of "Red." In the preceding example both "4" and "Red" are data values.

An analysis may be performed on a single service group component, and the analysis data may then be applied to a BASG baseline. For example, a component: "Virtual Machine w2k3004" may be analyzed to convey information to the user and to the system 100. The inference engine 633 may traverse the RDF frame work file and read the specific entries for a specific component. For example, for "Virtual Machine w2k3004 uses storage device Gig2Network," traversing this triple will result in the system being directed to read the triples for the classes that end the component triple of the originating query. If the component being analyzed is "John-Drove-Car" the inference engine 633 will search for "Car" triples and analyze those triples in the same way until all avenues are exhausted. The resulting ontology is based on the results of this analysis. Further analysis can be performed on the resulting ontology by taking into account the data values in the form of a "state" or explicit data received from external sources that also describes the triple members as well as the individual components.

Analyzing a triple yields a relationship, and following all the members of that triple as references for other triples yields an aggregated analysis. Taking into account the data values of triple members that are not related to the original analyzed triple and correlating the results based on data values provides an advanced aggregated analysis. For example, an analysis that yields the result "John-Drove-Car", yields an aggregated advanced analysis "John-Drove-Ferrari." Continuing with the same analysis, another advanced aggregated analysis may yield that "John-Drove-Ferrari", "Ferrari Exceeded 190 mph", and that "Lamborghini also Exceeded 190 mph."

Figure 2B:
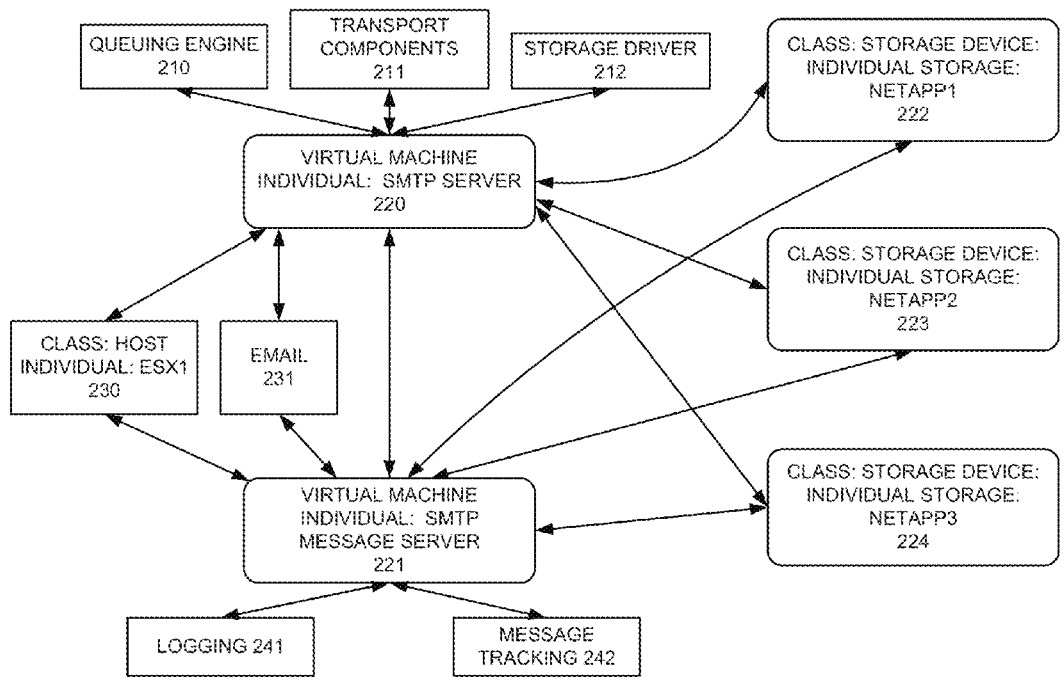
FIG. 2B illustrates a detail of ontological creation engine, according to an example embodiment.

The baseline is processed for a single entity comprised of an aggregate of component nodes. For example, the baseline may be performed for a BASG that includes multiple different components. A baseline may be established for a business process, such as, corporate E-mail. The components of the BASG may include various components as included in the example baseline configuration of FIG. 2B. Referring to FIG. 2B, baseline components may include examples, such as, class: storage device, individual storage: "Netapp1" 222, class: storage device, individual storage, "Netapp2" 223, class: storage device, individual storage: "Netapp3" 224, class: primary application: individual e-mail 231, class: primary application: host individual: ESX1 230, class application: individual logging 241, class: primary application, primary application: individual e-mail, class application: individual message tracking 242, class: primary application, primary application: individual E-mail, class application: individual queuing 210, class: primary application, primary application: individual e-mail, class application: individual storage driver 212, class: primary application, primary application: individual e-mail, class application: individual transport components 211, virtual machine individual: SMTP server 220, virtual machine: individual: SMTP message server 221.

As noted above, the components along with their object properties and data values are used to provide a base-lined state. A modification to the baseline, such as, accepting a greater or lesser state for an individual entity of the BASG will result in a new baseline being established for this particular BASG.

In operation, the system 100 monitors for a steady state condition of a currently operating BASG by tracking BASG service tier thresholds that have been assigned to accomplish a business process cycle (completed task) while operating within the thresholds identified as normal (green). When the BASG being monitored operates within normal service tier threshold parameters through three consecutive business application cycles, the system 100 will consider the operating conditions of that base-lined BASG based on those currently assigned and observed service tier thresholds.

A business application process cycle may be comprised of a session that contains an initiation of network activity that is observed by the executables that are part of the primary application for the BASG. Once the communications have ceased and are verified by the user to have been completed successfully, the business application process cycle is recorded in the database.

The business application process cycle is assigned as a baseline candidate for the BASG. The system creates candidates automatically by creating a record of the service tier threshold performance during a business application process cycle (BAPC), which may be validated by the user initially. The system will then automatically create a baseline as illustrated in FIG. 2B. The BAPC yields the components that are involved in the "communicates_with" object value and the indirect components that support those components. The result is an automatic base-lining of service groups which form the basis for the components included in the BASG. That is, the components are used to create a relative match to a user selected categorized BASG.

The process to automatically baseline a BASG is achieved by the business logic 624 requesting the known service groups from the RDF API knowledge base 620. The SQARQL query engine 622 then initiates a query to gather all the class, object properties, and data values from the knowledge base 620. The SQARQL query engine 622 simultaneously initiates a query for performance threshold data in a database. This performance data is comprised of three separate instances of normal threshold data obtained within a business application process cycle.

The business application process cycle may be comprised of a session that contains an initiation of network activity that is observed by an agent of the executables included in the primary application for the BASG. Once the communication has ceased and is verified by the user via the web browser 102, a message is sent through the controllers 627 to the business logic 624. This business application process cycle is assigned as a baseline candidate by the resulting EJB 612, which, in turn, records the established candidate in the database.

Candidates may be created automatically by the system 100 via the SPARQL query engine 622 initiating a query for any existing candidates upon startup of the application server 101, such as, JBOSS. The SPARQL query engine 622 creates a Java Bean EJB, which, in turn sends a Java message service (JMS) message to the agent to observe network traffic that is initiated by an executable contained within a primary application. The agent will then observe for a successful completion of the business application cycle. The web browser 102 then updates the user that a baseline for a given BASG exists. The BASG baseline (see FIG. 2B) may then be monitored for changes by utilizing a configuration drift analysis.

A drift analysis method will now be described with reference to FIG. 1. Referring to FIG. 1, a user selection of a node that has been reported to have changed state via an administrative console interface inventory view is received. Nodes that are of particular importance may include those nodes that are now indicated to be in an alert state. The web browser 102, via the administrative console interface inventory view receives the request and processes the network ontology for a given node to determine any related enterprise entities that also include a changed state, including other network nodes, applications, service groups, etc. In one embodiment, related entities that are now in an alert state are determined, whether or not the indicated node is in an alert state. An RDF API knowledge base engine 620 uses the state information for the node's network ontology to generate an impact summary view that indicates the states of the related enterprise entities. The impact summary view may then be displayed to the user through the web application interface 111.

A specific example for generating an impact summary will now be described. When an agent 500 first begins acquiring data, inventory, configuration and events, messages are sent from the agent 500 to the message driven EJB 623 as shown in FIG. 1. The data is received and forwarded to an I/O processor for routing to a queue of the business logic EJB 624. Once routed an appropriate entity java bean (EJB) is created in the EJB message driven engine 623 for the agent message. Entity Java beans (EJB) are created for the inventory, configuration, and event messages separately. A notification is sent to a real-time bus once the EJB message driven bean engine 623 has created the entity bean. At the same time, notification is sent to the RDF (resource definition frame work) API knowledge base engine 620 and the OWL (ontological web language) file is updated.

The agent 500 continues to periodically report the node inventory, configuration and events in subsequent messages which create further beans at the EJB message driven engine 623. Entity beans are sent to a database as configuration tables via an object-relational mapping (ORM) library, such as, Hibernate or Toplink. For example, Hibernate provides a framework for mapping an object-oriented domain model to a traditional relational database and controls object-relational impedance mismatch problems by replacing direct persistence-related database accesses with high-level object handling functions.

The web application interface 111 may be configured to provide an inventory view to the web browser 102. An example inventory view may provide a list of available nodes as well as related data for that node, such as a state. The inventory view may be ranked by state, so that nodes that have a high alert level are listed at the top. Selecting a node ID, e.g. virtual machine "WXP32 bit_fse_4025", creates a summary view for that node. An example summary view is generated when the user selects a node ID by first sending the node ID in a query to the database. The query returns data relating to the node ID. The impact summary view is then generated by the web application 111 from the returned query data.

In one example embodiment, the query returns any related applications and nodes that have been placed into an alert state. For example, the query may return nodes and applications having a service tier threshold change that is "Red" (Error), or an infrastructure status condition warning, or a communication severed message. These state messages may be returned by the state and profiling engine 626. The user is able to view the impact that a changed state of a particular node has had on other nodes of the enterprise network, particularly when that node enters an alert state. Using this view, the user is able to determine whether the changed state is critical or not. A critical changed state will be a state where the business applications are no longer able to function adequately, whereas a less critical alert state will have had minimal impact on other applications and nodes.

An example of virtual machine summary indicates the configuration of the VM, properties, and relationships, such as, an assigned baseline, cluster, host and service tier. Each of the elements may be summarized by a hyperlink that, when selected, provides more detailed data. For example, selecting a number of application hyperlinks of the configuration menu provides a table listing of all applications executed by the VM.

The impact summary for the virtual machine indicates the current CPU and memory status as well as any alert messages. In one example, the CPU may be indicated to be critical at 100% usage while the memory may be indicated to be operating within normal parameters below 80%. The impact summary may also indicate any dependent nodes and any affected applications. Examples of affected applications may be listed as "SQL", "SAP" and "EXCHANGE." The affected nodes may include storage and network device nodes. With configuration drift analysis of a BASG the only difference is that these items are "grouped" and a change to any one or more of these components them will result in a "configuration drift" of the whole BASG.

When the RDF API knowledge base 620 subsequently reports the existence of a new BASG, the configuration will be compared to the newly assigned BASG baseline to determine whether any parameters of the configuration are outside of the allowable limits set by the baseline. Over time, natural use and evolution of the network will cause changes to occur. The RDF knowledge base 620 will continue to report the current configuration of the node by way of configuration messages that include the updated configuration information.

The configuration messages are received at the state and profiling engine 626 included in a configuration bean that details the relevant data elements included within the aggregate of network nodes. For example, configuration messages may include the BASG baseline, which may include node ID, system properties, security (users and groups), applications, resource allocations (e.g., media, CPU, memory, and other system resources). These data elements are then compared by the state and profiling engine 626 by comparing their current components, such as, classes having specific individuals and data values, and the object properties with corresponding specific data values.

Virtual infrastructure messages may also be generated and communicated via the data agents 500 and these may indicate memory, CPU, disk allocations by the infrastructure and infrastructure warning messages provided by the vendor management system, such as, a VMware ESX server. The state and profiling engine 626 analyzes the configuration beans to determine whether there are any differences present when compared to the assigned baseline information. Configuration changes either relative to the baseline, or, to a previously reported configuration, may cause the state and profiling engine 626 to create a corresponding tracking entity bean that details the changes that have been made and the timing of these changes.

According to example embodiments of the present invention, tracking beans may be created for every detected configuration change. In another example, tracking beans may be created for configuration changes that violate previously defined allowable baseline drifts. In a further alternative, a combination of these methods and operations may be utilized to permit tracking beans to be created for drifts in some parameters, yet selectively created for drifts in other parameters.

In general, configuration drifts may be present in the operating conditions of the BASG(s), which would cause tracking beans to be created each time the RDF API knowledge base 621 reports the node configuration. To avoid unnecessary and persistent configuration drift alerts from being generated, comparisons may be made between a configuration report from the agent 500 and earlier generated tracking beans for that node so that tracking beans are created only for new configuration drifts.

The following terminology is used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

Networks including computer entities, physical and/or virtual machines operating on network nodes, etc., may be advantageously described via an ontology that describes the operational usage and current state of the entities rather than being based on a fixed IT infrastructure architecture. The ontological description may be automatically and dynamically updated based on data acquired from data collection agents deployed to the nodes of the network. The data collection agents observe communicative relationships based on connections between nodes in operational use, while annotating a class state. Using the ontological description, a network analyst or system operator may be provided with an improved ability to analyze network traffic.

Data relating to actual connections may be acquired automatically in near real-time. For example, an actual connection may be monitored in an interrupt-driven way while collecting information regarding an application that made the connection. Moreover a "volume for the connections" may be derived. A software-based data collection agent may be received by a computing device at a node within a communications network. The agent may be distributed to one or more nodes from a central node via the network. Once the software-based data collection agent is received, it may be inserted in an operating system of the receiving node. Advantageously, the agent may be inserted in the kernel of the operating system or in a user space (i.e., an area in virtual memory of a computer that contains user applications that execute at the application layer). The installation may be performed such that it is transparent or undetectable by a user of the node. The installed data collection agent may monitor data packet traffic between an adaptive driver layer and a protocol layer and report results of the monitoring to the central node.

In one example, the data collection agent may have an interface to an operating system's network stack and may periodically determine what applications are using the network stack. As a result, the data collection agent may track information regarding a network connection, the connection duration, and any applications and systems involved in the connection. Moreover, the data collection agent may normalize the foregoing information and report it to an administration console so that different operating systems may be correlated by the administration console.

As a further example, the data collection agent may include a network filter inserted into the network stack to determine exactly when a connection is made between entities. The filter component of the data collection agent may be inserted at one or more layers of the OSI model. For example, a data collection agent may have a filter interface at the transport layer and/or a filter interface at the network layer. The data collection agent may track information regarding a network connection, the connection duration, and any applications and systems involved in the connection. Moreover, the data collection agent may normalize the foregoing information and report it to the administration console so that different operating systems may be correlated by the administration console.

As yet a further example, the data collection agent described in the preceding paragraph may also include a packet filter inserted into the network stack to track connection data. For example, a data collection agent may have a filter interface at the data link layer. Then, the data collection agent may correlate and normalize (if required) data from the network filter and the packet filter to track information regarding the network connection, the connection duration, any applications and systems involved in the connection, connection status and connection resource usage information. Moreover, the data collection agent may normalize the foregoing information and report it to the administration console so that different operating systems may be correlated by the administration console.

Referring again to FIG. 1, an illustrative system 100 for deploying data collection agents onto network nodes, monitoring network connections instantiated at each network node, acquiring resulting data, automatically creating an ontological description of the network from the acquired data, and dynamically updating the ontological description will be described. The system 100 may further be used for monitoring configuration drifts within an enterprise network as will be described in more detail below. In an embodiment, elements of system 100 utilize the Java software platform and Enterprise Java Bean (EJB) architecture to provide certain functionality, and these well-known terms may be used in the description that follows.

According to example embodiments of the present invention, the process to automatically determine a performance allocation may begin by monitoring those virtual machines that have sustained a service tier threshold in either a critical low and/or a critical high level for more than 24 hours. Such an observation may be observed by the virtual machine agent. The SQARQL query engine 622 simultaneously initiates a query for current performance threshold data stored in a database.

The components' states may be determined because they have thresholds that are achieved, overachieved, or underachieved. Nodes, executables and the business application service groups (BASGs) may also incorporate status and alerts from infrastructure providers. The Executables may have a state that relates to the "communicates_with" relationship. For example, if an executable such as sqlservr.exe no longer communicates with node X, it may be designated critical high and indicated on a user interface as red or as a warning. This example may be true of a node that represents a "communicates_with" relationship as well as a primary application represented as a node.

The state and profiling engine 626 may set the state of the business application service group (BASG) using the agent data and system information. When any component of the BASG has achieved a "High Warning" state, the user may view the component as red (indicating a high warning) as well as the BASG in red on a graphical user interface.

The process to determine the state of an individual element may be based on a threshold that has been defined, for example, by the system administrator. The threshold may include a metric that either exceeds or underperforms in a specific area of interest to the system administrator. An example would be where a server in a network is exceeding a specified CPU utilization percentage.

Example embodiments of the present invention may automatically determine the optimum pairing of virtual machines in a business process application service group (BASG) to maximize performance as measured by a service tier threshold system. Example may include automatically analyzing the baseline of direct and indirect connections based on network interactivity of the applications that are utilized to perform a process.

A BASG is comprised of one to many nodes operating on the enterprise network. The basis for an automatic baselining procedure may be in the ontological structure of the categorized BASG. The resulting data file may contain a structure that includes classes, object properties, and data values. The system creates a profile type for each selected BASG host, storage device, and other network dependent components/elements. This profile may include specific attributes that are used to pair virtual machines with BASGs that allow the virtual machine to execute optimally.

Example operations may provide identifying specific virtual machines to pair with a specific business BASG. One or more virtual machines may be paired with one or more BASGs. The system may determine which BASGs are best suited for a pairing based on parameters that include high availability, high capacity, high speed, moderate capacity, moderate speed, moderate availability, low capacity, low speed, and low availability. These are considered by the system to be the BASG types. The virtual machines that require these attributes are then paired to these BASGS.

Initially, the system 100 may analyze each of the BASGs performance data to determine if any of the BASGs would benefit from a newly added virtual machine pairing. This analysis may be performed by processing the aggregate service tier thresholds of the host member(s) of the BASG. For example, by processing the state information of both the storage and network BASG dependencies, the need for additional virtual machines may be apparent. The storage and network state information may be factored with the host performance threshold data and state information to determine a profile of the BASG The BASG profile may include categories, such as, categories, which may include but are not limited to high availability, high capacity, high speed, moderate capacity, moderate speed, moderate availability, low capacity, low speed, and low availability.

FIG. 3B illustrates an example table of a BASG profile and its corresponding threshold data input and service tier threshold metric information required for a virtual machine candidate selection. Depending on the metrics that are measured, a virtual machine that is operating less than or above the specified metric ranges included in FIG. 3B, may not be considered a candidate for pairing with a particular BASG. The service tier thresholds may be based on the requirements of a particular BASG and its current operating baseline.

The system 100 may analyze the virtual machines to determine the optimal combination of host applications, storage required and network performance by analyzing the service tier threshold performance data acquired. Each virtual machine is assigned a profile requirement, such as, high availability, high capacity, high speed, moderate capacity, moderate speed, moderate availability, low capacity, low speed, and low availability. The system then pairs the virtual machine with at least one host, network, and storage group that has availability and may be assigned to a BASG. Or, alternatively, the BASG can produce availability by migrating one or more less optimally paired virtual machine elsewhere.

The system 100 may analyze the virtual machines to determine the optimal combination of host applications, storage required and network performance by analyzing the service tier threshold performance data acquired. Each virtual machine is assigned a profile requirement, such as, high availability, high capacity, high speed, moderate capacity, moderate speed, moderate availability, low capacity, low speed, and low availability. The system then pairs the virtual machine with at least one host, network, and storage group that has availability and may be assigned to a BASG. Or, alternatively, the BASG can produce availability by migrating one or more less optimally paired virtual machine elsewhere.

The system 100 may also provide a work order that can be processed by an orchestration system, or, individual, who is responsible for executing the changes. The system 100 routinely (as defined through the user interface) monitors the networking environment to maintain optimum virtual machine pairings with host, storage, and speed groups that include one or more BASGs.

Figure 3A:
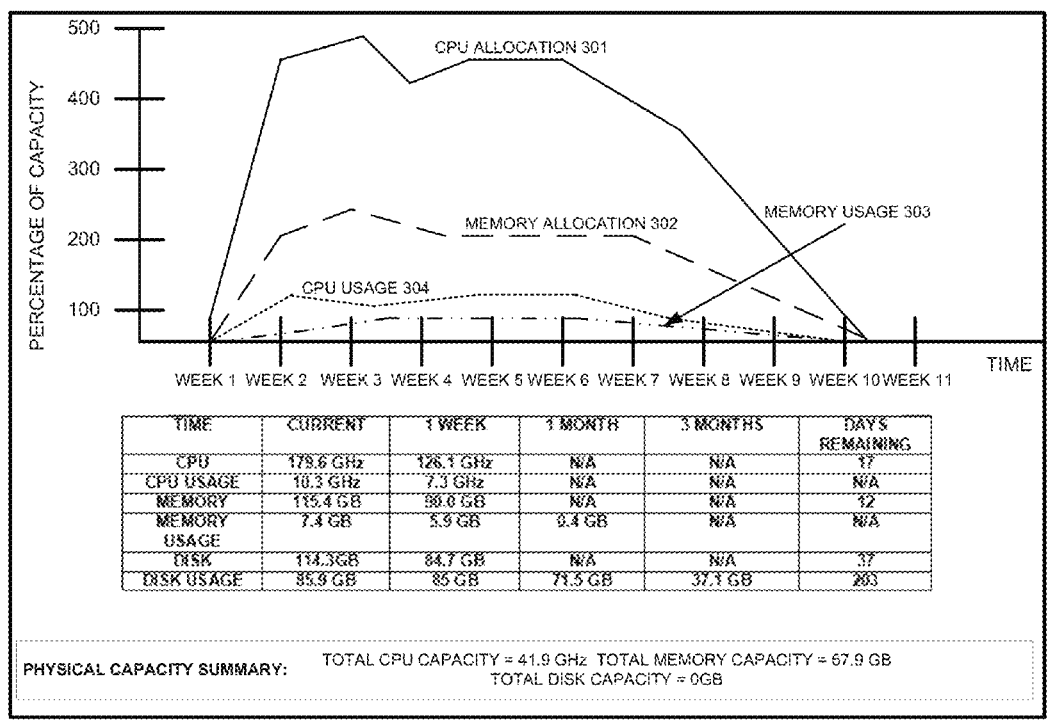
FIG. 3A illustrates an example graphical user interface to view the amount of allocated resources used over time, according to example embodiments of the present invention.

FIG. 3A illustrates an example graphical user interface (GUI) used to demonstrate resource allocation and usage over time, according to example embodiments of the present invention. Referring to FIG. 3A, a GUI for a system administrator may include a graph of percentage of capacity vs. time (weeks). Four example resources are included in the graph, including, CPU allocation 301, memory allocation 302, memory usage 303 and CPU usage 304. The performance details are illustrated it a table that includes the current baseline information, last week, last four weeks and last three months, and days remaining.

In FIG. 3A, a physical capacity summary is also provided for easy summarization of the total CPU capacity, memory capacity and disk capacity. This baseline summary provides a system administrator with a snapshot of operating conditions of the BASGs, virtual machines and overall available resources. This provides the system administrator with the information necessary to determine if the BASGs, virtual machines and available resources are being utilized efficiently throughout the network.

Figure 4:
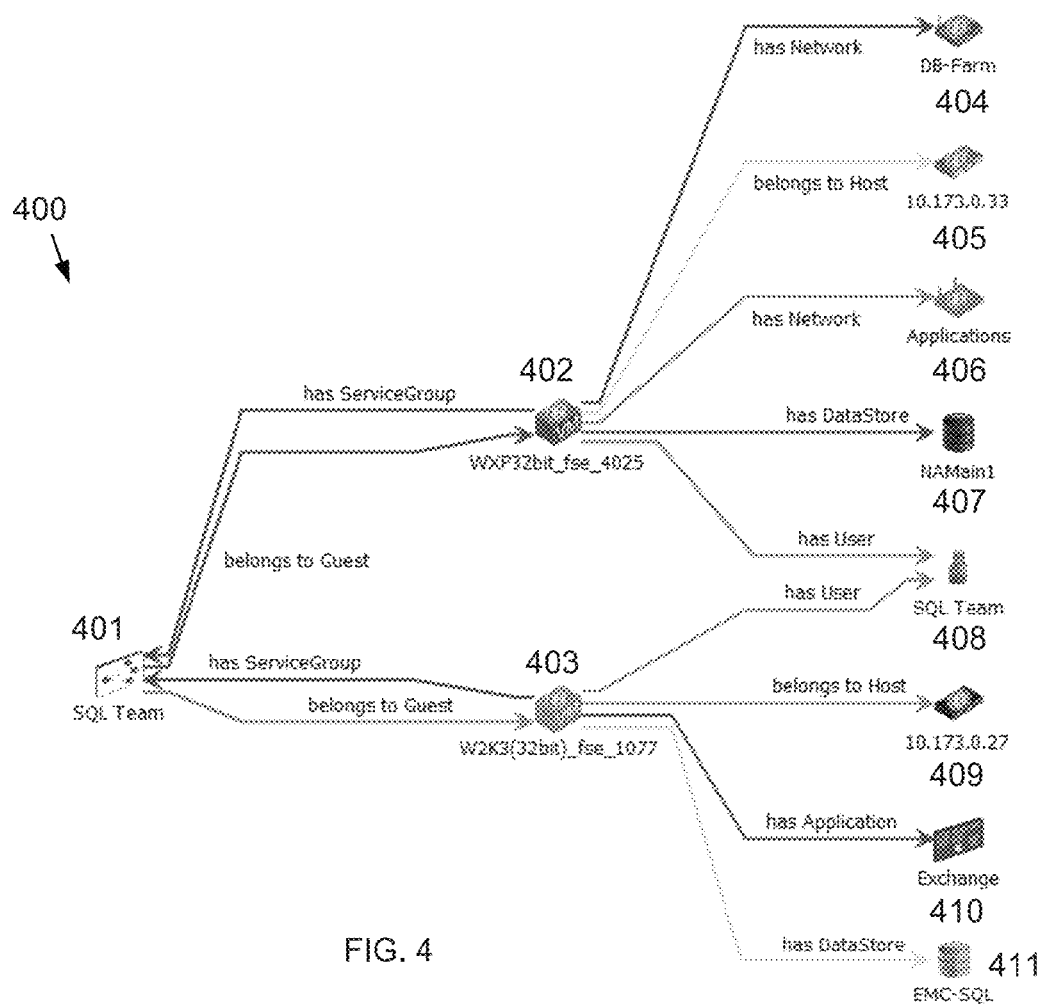
FIG. 4 illustrates a graphical user interface used to view the network hierarchy, according to example embodiments of the present invention.

FIG. 4 illustrates another example GUI according to example embodiments of the present invention. Referring to FIG. 4, a hierarchical logic flow diagram 400 includes a host device 401 and two different virtual machines 402 and 403. The various network resources 404-411 are illustrated as being assigned to at least one virtual machine. Resource icon 404 represents a logical network in the "enterprise" for virtual machine 402. It is associated with a device at the virtual infrastructure management level (i.e., ESX Server), which is a name for the network as it is known to the enterprise for our purposes.

Resource icon 405 is the physical host (hardware) for the virtual machine 402 along with other virtual machines, and is referred to as the hypervisor. Resource icon 406 is the network for virtual machine 402. It is the same as 404, a logical network in the "Enterprise", and is associated with a device at the virtual infrastructure management level (i.e., ESX Server), which is a name for the network as it is known to the enterprise for our purposes.

Resource icon 407 is a datastore for virtual machine 402. It represents a physical allocation of disk storage, and is associated with a hard disk storage device at the virtual infrastructure management level. Resource icon 408 is the "User" assigned to both virtual machines 402 and 403. It has been defined and assigned by this virtualization management software. Resource icon 409 is the host for virtual machine 403. The host is a physical host (hardware) that the virtual machine is running on, along with other virtual machines, and may be referred to as the hypervisor. Resource icon 410 is the primary application that is being executed on the virtual machine 403. Lastly, 411 is the datastore for the virtual machine 403. These resource icons may be dragged and dropped to reassign resources to the virtual machines, and, in turn, modify the allocations of the BASGS.

According to example embodiments of the present invention, they system 100 will automatically determine the optimum pairing of virtual machines with BASGs to maximize performance as measured by a service tier threshold monitoring system. In operation, upon initiation by the user through the web browser interface 102, the application server 101 may receive a message to survey the virtual machines for their respective CPU and memory usage over the past 30 days. The survey may be performed by the web application server 101 sending a request to the state and profiling engine 626 to compile the usage data from the database.

The state and profiling engine 626 may transmit a JMS message to the business logic 624 that compiles the database query. The business logic 624 generates an EJB based query that includes a request for CPU and memory usage data for the last 30 days. A ranking may be performed by the SPARQL query engine 622. An example of the data returned by the database is described with reference to FIG. 1. This data is used to rank the virtual machines. The ranking is averaged over the range of virtual machines returned. The ranked virtual machines are then assigned a profile by the state and profiling engine 626. The profiles may include high availability, high capacity, high speed, moderate capacity, moderate speed, moderate availability, low capacity, low speed, and low availability.

The breakpoints for the profiles may match the predefined service tier thresholds assigned by the system. Once all of the virtual machines have been assigned a profile based on their usage, the state and profiling engine 626 sends this list via a profile EJB to the RDF API knowledge base 620. Once completed, the system 100 initiates the process to compile a candidate list of BASG dependencies. The virtual machines that reside in the described ontological structures are not considered for the candidate process. The BASG candidate process is initiated by the state and profiling engine 626.

The state and profiling engine 626 sends a JMS request message to the business logic 624 to compile a list of candidate hosts, networks, and storage groups that are configured within the BASGs. The request is included within a profile EJB. This results in a database query for usage data for the last 30 days from the database. The business logic sends a request to the RDF API knowledge base 620 for state data for host, network, and storage roll-up data based on 24 hour roll-ups for the last 30 days.

The state data may contain warning or errors that resulted in a "red" state for the given nodes. The usage and state information are sent back to the state and profiling engine 626, where they are used to rank and profile the BASGs. The ranked BASGs are then assigned a profile by the state and profiling engine. The BASG profiles may include high availability, high capacity, high speed, moderate capacity, moderate speed, moderate availability, low capacity, low speed, and low availability. The breakpoints for the profiles may match the service tier thresholds previously assigned by the system.

The state information for each BASG may be used to assign a profile by automatically assigning a "low" profile to any BASG that is experiencing a warning or error (red indication). The error may be based on a 20% margin of exceeding the predefined resource threshold, and may be based on a 24 hour data roll-up for a 30-day period. No virtual machines are used to rank a BASG. The virtual machine itself is ranked in the virtual machine profile process mentioned above. Once all BASGs have been profiled, the state and profiling engine 626 may use a standard matching algorithm to pair the virtual machines with BASGs. The state and profiling engine 626 generates a report that details the recommended change in virtual machine assignment to BASGs. This list may be formatted in XML to be utilized by an orchestration system to complete the changes, or, to be read by a user for manual adjustments to assignments.

The states of the individual business application service components may be aggregated to calculate an overall state for the BASG. Any support nodes within the BASG ontology that have achieved a high warning may be labeled under the BASG as having a high warning. The ontology begins as a file and then it is migrated to memory. If any one node with a "communicates_with" relationship achieves a high warning status it may be identified as having a high warning for its associated BASG. High errors may be identified in a similar manner. For example, in order for a node to achieve these states, the states must have been observed and processed by the state and profiling engine 626 three times within one hour, or, within a similar time frame. As a result, spurious errors and random faults will not lead to warnings being generated for the overall business application process.

Figure 5:
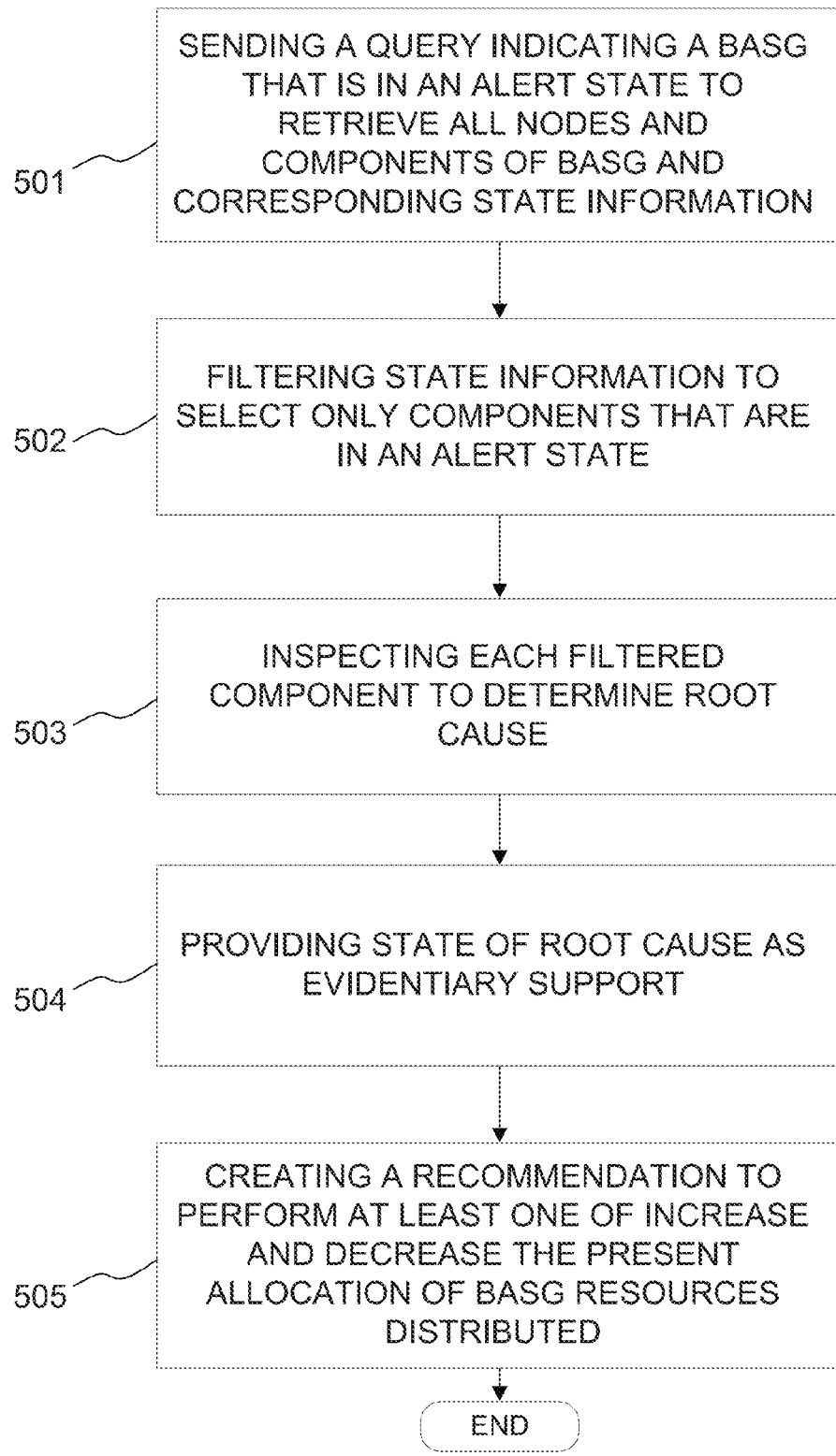
FIG. 5 illustrates an example flow diagram, according to example embodiments of the present invention.

One example method for processing state information of the elements of a business process ontology, and, more specifically, for a BASG that is in an error state will now be described with reference to FIG. 5. The method of FIG. 5 may be performed by processing logic that may comprise hardware (e.g., circuitry, dedicated logic, programmable logic, microcode, etc.), software (such as instructions run on a processing device), firmware, or a combination thereof. In one embodiment, the method is performed by a server (e.g., application server 101 of FIG. 1).

At operation 501, a query is sent to the RDF knowledge-base 620 that identifies the BASG that is currently in an error state. The RDF knowledge base 620 returns the list of components of the BASG (e.g., hardware nodes, virtual nodes, executables, processes, primary applications, etc) and their state.

It should be noted that the primary application of the BASG is considered by the RDF knowledge base to be a "node." Any of these components of the BASG may have independent thresholds assigned by the system administrator. Examples of components may include virtual machines, host machines, storage devices, network devices, etc. Examples of resources that are allocated may include memory, CPU, storage disk space, network adapters, etc. Examples of metrics may include a CPU utilization of 1024 Ghz, a memory utilization of 8 gigabytes, a network adapter operating at 100 Mbps, etc.

At operation 502, a filter is applied to determine those components that may have contributed to the "high warning" threshold that was exceeded and which triggered an alarm. In one example embodiment, the filter omits any individual component that has not exceeded a "high warning" threshold individually from the process. This may reduce the chances of false alarms occurring due to random instances of a predefined threshold being exceeded.

At operation 503, the process continues by inspecting each of the filtered components to determine a root cause. The inspection process looks up performance data previously reported by the agents deployed to the nodes. The inspection process may yield all of the component's relevant data for determining a root cause. In one example, the data used for this determination is service tier data, such as, CPU, memory, disk, and network operation threshold roll-up data (last 30 days), though other relevant data may also be used.

The root cause process may also use virtualization infrastructure alarms and network status updates. These are available to the system for host, virtual machines, disks, and network devices, and may be sent in messages from a proxy agent. The proxy agent may contain an instruction for translating virtual infrastructure messages to a format that the state and profile engine 626 can process. If, for example, the proxy agent receives a message from the virtual infrastructure stating a disk has achieved full capacity and has an error level of 3, the proxy agent will modify the received message with a translation on the "level of 3" to "High Error." This is then sent to the message driven bean factory 623, where an EJB is created with the contents received from the proxy agent. The business logic then routes the new state EJB to the state and profiling engine 626. This data is provided to the user as evidence for the root cause conclusion.

The SPARQL query engine 622 determines the state of the primary applications and the contributing executables that make up the primary application by requesting the ontology for the business application service. The ontology is analyzed for breaks in communication with nodes, as described in the Applicant's co-pending applications referenced above.

The SPARQL query engine 622 will send a request to the agent to send back the performance statistics of the executables that make up the primary application of the business application service. This will provide the user with the real-time performance statistics of the executables to provide support for a conclusion that a root cause of failure is due to the failure of the primary application support nodes, at operation 504. The result of conclusion may automatically trigger a recommendation to perform an increase and/or decrease in the present resource allocation of resources provided by a virtual machine(s), at operation 505. For example, CPU resources and disk space may be reallocated from among the network resources by the system administrator as a result of receiving the recommendation. Or, alternatively, certain reallocation measures may be performed automatically.

System 100 may comprise an application server 101, which interacts across a network with a number of data collection agents 500 deployed in various nodes of the network. Advantageously, application server 101, may be an element of an administrative console (AC) that also provides a suite of network management tools. A system administrator may perform network traffic analysis and/or other network management tasks by accessing application server 101 by way of web browser 102. Application server 101 may comprise an EJB module 612, an ontological description creation engine 613, and a web application 111.

Data collection agents 500, as described throughout the specification, may be deployed onto network nodes including physical and/or virtual machines in an enterprise IT infrastructure environment. After such deployment, application server 101 receives messages from data collection agents 500. These messages may include data representing, for example, state and relationship information about the network nodes, configuration information related to the IT infrastructure, performance/utilization data and network communication.

The received messages may be initially handled by EJB module 612. For example, message driven EJB module 623 may initially inspect a received message. A received message relating to network traffic or node status may be forwarded by message driven EJB 623 to the business logic EJB 624. Business logic EJB 624 may call network traffic analysis engine 625 for messages relating to network traffic. Alternatively, "infrastructure messages" (i.e., those relating to node status) may be forwarded directly to the state and profiling engine 626.

Messages forwarded to the state and profiling engine 626 may then undergo sorting and processing. The state and profiling engine 626, for example, may identify the entities within the IT infrastructure as well as their dependency on one another, based on messages received from the platform. In addition, state and profiling engine 626 may perform further processing to determine the state of one or more entities. The states may be based on a threshold that has been defined, for example, by the system administrator. The threshold may be based on a metric that either exceeds or underperforms in a specific area of interest to the system administrator. An example would be a server operating in a network that is exceeding a specified CPU utilization percentage. The threshold may be set to 80% CPU utilization and if the server is operating at 81%, the threshold is being exceeded.

Example embodiments for determining a required resource allocation of a virtual machine based on thresholds are discussed below. The web application server business logic creates a message request to provide the necessary changes in virtual machine performance allocation variables to create a condition of no critical low and/or no critical high conditions for the next 24 hours. If the recommended change is not successful, the cycle repeats by incrementing the 24 hour period with no critical low and/or no critical high warning by the service tier threshold system. Another 24 hour monitoring period may then begin.

A recommendation of a change in a variable by a factor of 10% (increase or reduction) may be a general modification used to satisfy a threshold condition that has been exceeded/underperformed. The 10% factor modification may be used until the virtual machine exceeds a performance request, which results in the web browser 102 initiating a message to the web application 111 and controllers 627 of the virtual machine. This modification, in turn, creates a message driven entity bean that contains the request, which is transferred to a rules engine. The rules engine sends a request to gather a historical period of information to the web browser 102. Such historical information may be for a period of 1 to 90 days. The rules engine (not shown) may be part of creation engine 613 and/or EJBs 612.

The rules engine message is sent to a database (not shown) to gather the data tables requested. The database sends the data back to the rules engine. The rules engine factors the data resulting in a recommendation to increase or decrease the allocation for each of the performance threshold criteria, which may include, for example, CPU utilization, memory utilization, data storage utilization, and network resource utilization.

The resource modification recommendation is created by the rules engine 613. The creation engine 613 may also be referred to as the rules engine. The rules engine 613 may perform averaging the actual threshold observed by the service tier threshold integer (0-100 scale). The average is only taken from metrics observed while the virtual machine is observed in its normal operating range. If no normal range is observed, than the rules engine will increment the recommended change by increasing or decreasing the allocated resource(s) by 20% until a normal range is observed over a period of 24 hours. According to one example, the recommended increase or decrease is only 10% for a period following 24 hours if the data gathered does contain "normal" range input data.

A proxy agent (not shown) may be part of the local agent 500 that is used to collect data. In operation, the proxy agent collects data from the virtual infrastructure management provider. The user will utilize the default thresholds or adjust them as deemed necessary. Thresholds are used by the state and profile engine for tracking the "state" of the nodes that make up the components for a business application process. The inventory in the database may be updated by the proxy agent with a list of virtual machines, storage, hosts, and network devices.

The agent may be deployed via the physical hosts connected directly to the virtual machine's O/S. The state and profile engine 626 assigns the "state" of the various network components and receives additional input from the proxy agent to factor into the "state" (e.g., alarms, network, and "communicates_with" relationship status) and updates the RDF knowledge base 620 ontologies to reflect the assignments. The agent tracks executable applications to determine what other nodes are communicating with the virtual machines (VMs) in the enterprise.

The network traffic analysis engine 625 determines which executable applications and services are communicating with other nodes that constitute a "communicates_with relationship." A determination may be made as to whether any pairs of nodes have a "communicates_with relationship." Upon the assignment of a "communicates_with" relationship to the ontology of a node and its direct and indirect relationships, the state and profiling engine 626 assigns the group of nodes as a "service group."

The RDF knowledge base 620 contains an ontology for each individual node. The model and structure the system uses to create and update the knowledge base is contained within the ontology web language (OWL) file present on the application server 101. The state and profiling engine 626 tracks the "state" continually of the components and receives additional input from the proxy agent to factor into the "state" (e.g., alarms, network, and "communicates_with" relationship status).

The user may identify a "service group" of network nodes as a business application service group (BASG) by selecting a name for the group of nodes and the executables that are the basis for the "communicates_with" relationship. The user may also add nodes that the system did not auto-detect as a component of the service group. Those added nodes will be recorded and stored in the ontology model 621.

A determination may then be made as to whether the user has assigned additional nodes and/or names to the service group. The ontology itself provides the direct and indirect dependency information of the nodes that the SPARQL query engine 622 requires to infer the impact a change in "state" will have on the rest of the service group. For instance, if a storage device's (component) state is changed to "RED" because it is almost full (e.g., only two gigabytes left of a 1500 gigabyte memory) then this may cause the physical host to start the paging memory, which will effect the performance of any and all virtual machines running on that physical host.

The SPARQL query engine 622 parses the service group ontology for the components that have a "communicates_with" relationship, which forms the basis for a primary application. The state and profiling engine 626 tracks the "state" of the BASG by requesting the current "state" from the RDF knowledge base 620 and updating the ontology when any new messages are received from the business logic EJB factory 624. A new message can be created by an agent or the virtual infrastructure provider management system. The new message will include items, such as, new hosts, virtual machines, network devices, storage devices, as well as statuses for these items. The inference engine 633 adds these items into the RDF API knowledge base 620 while it is in memory. If any of these items exist as components, then the new data is added/modified in the ontology stored in memory.

The ontology itself provides the direct and indirect dependency information the SPARQL query engine 622 requires to infer the impact a change in "state" will have on the rest of the BASG. SPARQL query engine 622 parses the BASG ontology for the components that have a "communicates_with" relationship, which forms the basis for a primary application.

For example, SPARQL query engine 622 provides a list of candidate BASG members for base-lining and adjusting that may be needed to achieve "normal" acceptable performance levels. By parsing the BASG ontology for primary applications that have "communicates_with" relationships with "virtual machines" that have operated in a "normal" level of threshold for 3 consecutive business cycles may yield a list of qualifying components. SPARQL query engine 622 may parse the BASG ontology to determine the components that have a "communicates_with" relationship. Such components may be used to form the basis for a primary application. SPARQL query engine 622 may generate a list of virtual machine and BASG member pairing recommendations.

Web application server 101 may receive the message to survey the virtual machines for their CPU and/or memory usage over the past 30 days. Web application server 101 may send a request to the state and profiling engine 626 to compile the usage data from the database. The state and profiling engine 626 sends a message to the business Logic that compiles the database query. The business logic 624 generates an EJB based query that includes a request for CPU and memory usage data for the last 30 days.

According to example embodiments of the present invention, the SPARQL query engine 622 may parse the service group ontology data to determine the components that have a "communicates_with" relationship. This relationship information may be used to form the basis for a primary application. The user may communicate via a web interface of the web application 111 and assign a name to the service group.

The state and profiling engine 626 tracks the "state" of the BASG as an aggregate of each of the components of the BASG, by requesting the current "state" from the RDF API knowledge base 620 and updating the ontology information when any new messages are received from the business logic 624 of the EJBs 612. SPARQL query engine 622 provides a list of BASGs that may be used for base-lining and for making any adjustments to achieve "normal" acceptable performance levels. Parsing the BASG ontologies for primary applications that have "communicates_with" relationships with "virtual machines" that have operated in a "normal" threshold level for three consecutive business cycles may yield a list of primary applications that have associated triples with data values associated with those triple members.

The business logic 624 may perform requesting the service groups from the RDF API knowledge base 620. The SPARQL query engine 622 then initiates a query to gather all the class, object properties, and data values from the API knowledge base 620. The SQARQL query engine 622 may simultaneously initiate a query for performance threshold data from a remote database (not shown). The performance threshold data may include three separate instances of normal threshold data within a business application process cycle (BAPC). The BAPC may include a session that provokes network activity that is observed by the agent of the corresponding executable of the primary application for the BASG.

Once the communication has ceased and is verified by the user via the web browser 102, a message may be sent through the controllers 627 to the business logic 624. The BAPC may be assigned as a baseline candidate by the resulting EJB 612, which, in turn, records the candidate into a database. Candidates are then created automatically by the system 100 via the SPARQL query engine 622 which performs initiating a query for any existing candidates. The query may be performed upon startup of the application server 101. The SPARQL query engine 622 creates an EJB 612, which, in turn, sends a Java® message service (JMS) message to the agent to observe network traffic that is created by an executable contained within a primary application. This results in a base-lined BASG that can be monitored for changes just as a single entity may be monitored within the configuration drift system.

The BASG baseline may be monitored for changes by utilizing a configuration drift analysis by the state and profiling engine. SPARQL query engine 622 may provide a list of identified BASG baselines. These baselines may then be inserted into the state and profiling engine 626 for a configuration drift analysis. Drifting may include any changes that have occurred from a previous BASG configuration. For example, a component (class), an object value (verb), or, a data value, such as, the state of any of the assets of a BASG, each represent examples of potential changes that may occur.

After a drift analysis is performed, the SPARQL query engine 622 provides the business logic 624 of the EJB 612 with a message detailing a list of BASGs, and updates the user by providing the information via the web browser 102. The user selects one or more of the baselines of the BASGs. The baseline may be selected for use by a future simulation engine and/or for use by a future prediction engine.

Figure 6:
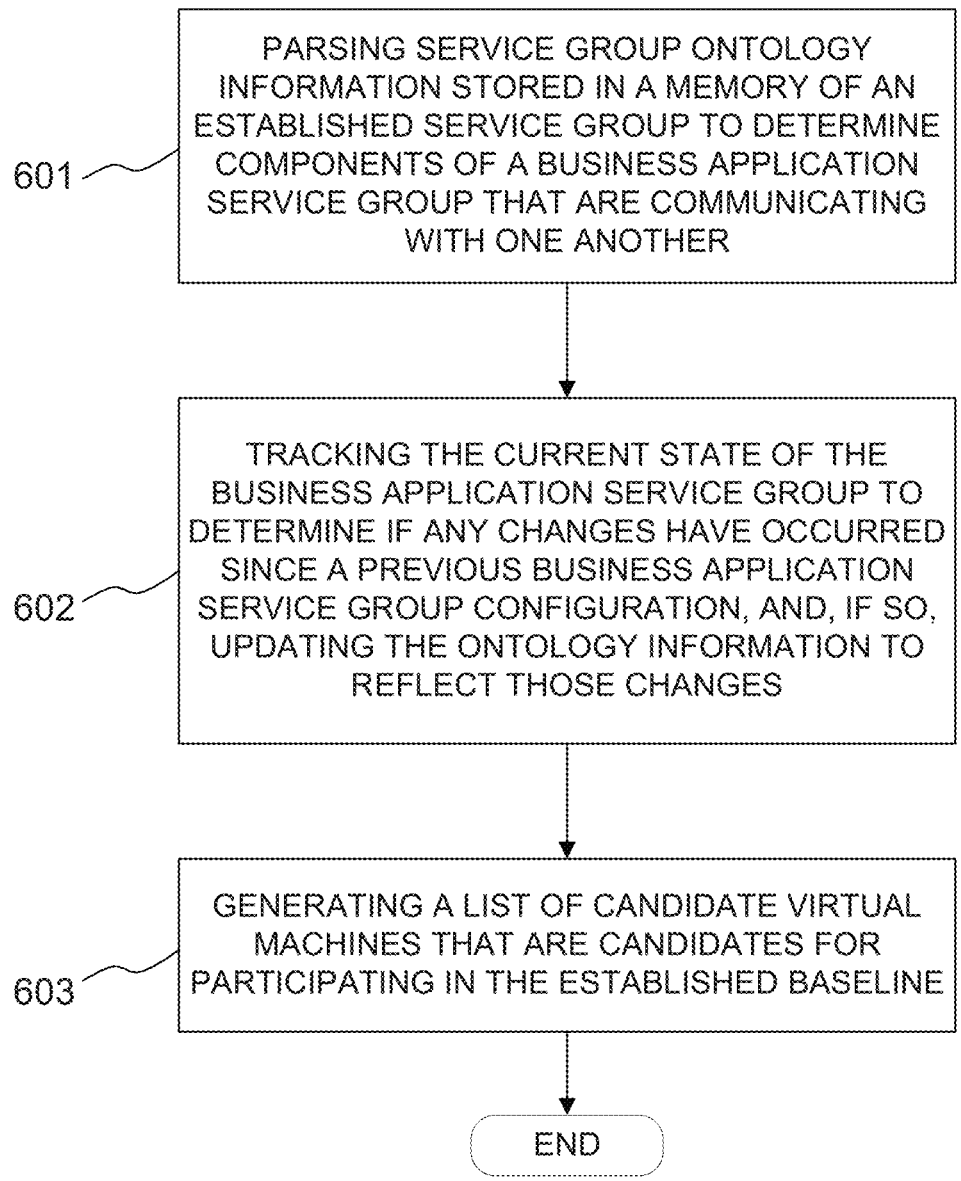
FIG. 6 illustrates another example flow diagram, according to example embodiments of the present invention.

FIG. 6 illustrates an example method of operation of a method of automatically establishing a baseline of virtual machines operating in a network, according to example embodiments of the present invention. The method may be performed by processing logic that may comprise hardware (e.g., circuitry, dedicated logic, programmable logic, microcode, etc.), software (such as instructions run on a processing device), firmware, or a combination thereof. In one embodiment, the method is performed by a server (e.g., application server 101 of FIG. 1).

The method may include parsing service group ontology information stored in a memory of an established service group to determine components of a business application service group that are communicating with one another, at operation 601. The method may also include tracking the current state of the business application service group to determine if any changes have occurred since a previous service business application service group configuration, and, if so, updating the ontology information to reflect those changes, at operation 602, and generating a list of candidate virtual machines that are candidates for participating in the established baseline, at operation 603.

Figure 7:
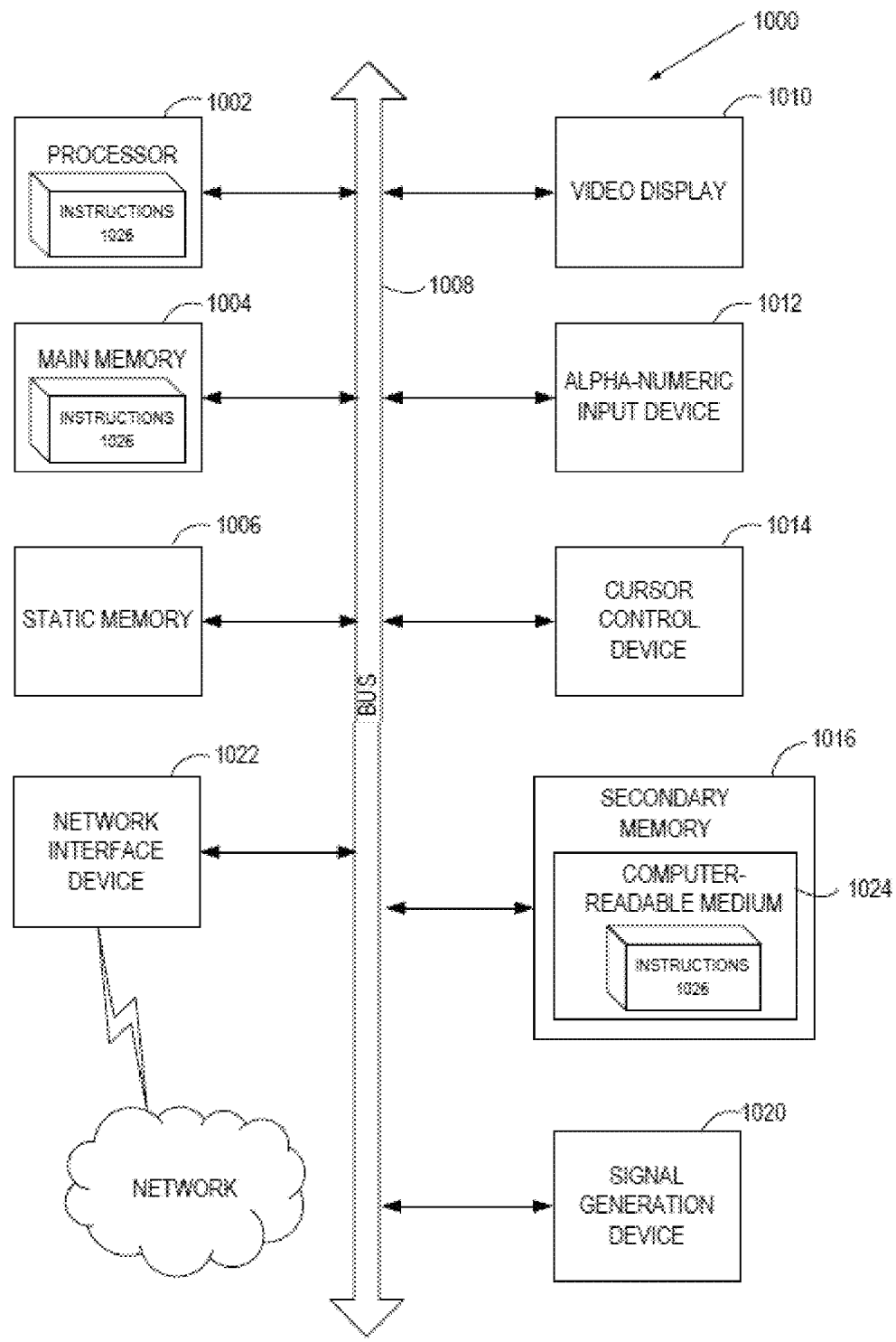
FIG. 7 is a block diagram of an exemplary computer system that may perform one or more of the operations described herein, according to example embodiments of the present invention.

FIG. 7 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1016 (e.g., a data storage device), which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The secondary memory 1016 may include a machine-readable storage medium (or more specifically a computer-readable storage medium) 1024 on which is stored one or more sets of instructions 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

The machine-readable storage medium 1024 may also be used to store software performing the operations discussed herein, and/or a software library containing methods that call this software. While the machine-readable storage medium 1024 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "encrypting", "decrypting", "sending" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method comprising:
parsing, by a processing device, ontology information of a business application service group combining a plurality of current virtual machines to perform a business process within an enterprise network, the business application service group having a profile comprising a performance threshold and assigned state parameters;
determining, based on the parsed ontology information, a first baseline to perform the business process, the first baseline comprising a set of current virtual machines within the plurality of current virtual machines of the business application service group that are communicating with one another;
tracking a current state of the business application service group to determine if any changes have occurred since a previous configuration of the business application service group;
responsive to determining that the current state of the business application service group has changed since the previous configuration, updating the ontology information to reflect the changes in the current state of the business application service group;
displaying information indicating the updated ontology information in a user interface; and
generating, based on the updated ontology information, a second baseline comprising a list of candidate virtual machines added to the set of current virtual machines within the plurality of current virtual machines of the business application service group, the second baseline conforming to the performance threshold and assigned state parameters.

2. The method of claim 1, further comprising:
modifying the business application service group by adding one or more of the candidate virtual machines; and
monitoring the business application service group for any changes in the current state of the business application service group.

3. The method of claim 2, wherein monitoring the business application service group comprises determining if any drifting has occurred by determining if any changes have occurred from the previous business application service group configuration.

4. The method of claim 3, wherein the changes comprise changes to at least one of a component class, an object value, or a state of a plurality of assets of the business application service group.

5. The method of claim 1, wherein the business application service group further comprises at least one of hardware nodes, virtual nodes, executables, processes or primary applications operating in the business application service group.

6. The method of claim 1, further comprising:
establishing the first baseline by sending a query to a database to obtain performance threshold data based on a plurality of separate instances of measuring the performance threshold data.

7. The method of claim 1, further comprising:
establishing a plurality of additional baselines for the business application service group.

8. An apparatus comprising:
a memory to store instructions; and
a processor, executing the instructions and coupled to the memory, to:

parse ontology information of a business application service group combining a plurality of current virtual machines to perform a business process within an enterprise network, the business application service group having a profile comprising performance threshold and assigned state parameters,
determine, based on the parsed ontology information, a first baseline to perform the business process, the first baseline comprising a set of current virtual machines within the plurality of current virtual machines of the business application service group that are communicating with one another,
track a current state of the business application service group to determine if any changes have occurred since a previous configuration of the business application service group,
update the ontology information to reflect changes in the current state of the business application service group responsive to determining that the current state of the business application service group has changed since the previous configuration,
display information indicating the updated ontology information in a user interface, and
generate, based on the updated ontology information, a second baseline comprising a list of candidate virtual machines added to the set of current virtual machines within the plurality of current virtual machines of the business application service group, the second baseline conforming to the performance threshold and assigned state parameters.

9. The apparatus of claim 8, wherein the processor is further to modify the business application service group by adding one or more of the candidate virtual machines, and monitor the business application service group for any changes in the current state of the business application service group.

10. The apparatus of claim 9, wherein the business application service group is monitored by determining if any drifting has occurred by determining if any changes have occurred from the previous business application service group configuration.

11. The apparatus of claim 10, wherein the changes comprise changes to at least one of a component class, an object value, or a state of a plurality of assets of the business application service group.

12. The apparatus of claim 8, wherein the business application service group further comprises at least one of hardware nodes, virtual nodes, executables, processes or primary applications operating in the business application service group.

13. The apparatus of claim 8, wherein the processor is further to establish the first baseline by transmitting a query via a transmitter to a database to obtain performance threshold data based on a plurality of separate instances of measuring the performance threshold data.

14. The apparatus of claim 8, wherein the processor is further to establish a plurality of additional baselines for the business application service group.

15. A non-transitory computer readable storage medium comprising instructions that when executed cause a processor to perform operations comprising:
parsing, by a processing device, ontology information of a business application service group combining a plurality of current virtual machines to perform a business process within an enterprise network, the business application service group having a profile comprising a performance threshold and assigned state parameters;

determining, based on the parsed ontology information, a first baseline to perform the business process, the first baseline comprising a set of current virtual machines within the plurality of current virtual machines of the business application service group that are communicating with one another;

tracking a current state of the business application service group to determine if any changes have occurred since a previous configuration of the business application service group;

responsive to determining that the current state of the business application service group has changed since the previous configuration, updating the ontology information to reflect the changes in the current state of the business application service group;

displaying information indicating the updated ontology information in a user interface; and generating, based on the updated ontology information, a second baseline comprising a list of candidate virtual machines added to the set of current virtual machines within the plurality of current virtual machines of the business application service group, the second baseline conforming to the performance threshold and the assigned state parameters.

16. The non-transitory computer readable storage medium of claim 15, wherein the operations further comprise:

modifying the business application service group by adding one or more of the candidate virtual machines; and monitoring the business application service group for any changes in the current state of the business application service group.

17. The non-transitory computer readable storage medium of claim 16, wherein monitoring the business application service group comprises determining if any drifting has occurred by determining if any changes have occurred from the previous business application service group configuration.

18. The non-transitory computer readable storage medium of claim 17, wherein the changes comprise changes to at least one of a component class, an object value, or a state of a plurality of assets of the business application service group.

19. The non-transitory computer readable storage medium of claim 15, wherein the business application service group further comprises at least one of hardware nodes, virtual nodes, executables, processes or primary applications operating in the business application service group.

20. The non-transitory computer readable storage medium of claim 15, wherein the operations further comprise:

establishing the first baseline by sending a query to a database to obtain performance threshold data based on a plurality of separate instances of measuring the performance threshold data.

* * * * *